(12) United States Patent
Beavin et al.

(10) Patent No.: US 10,810,201 B2
(45) Date of Patent: *Oct. 20, 2020

(54) TECHNOLOGY FOR JOIN PROCESSING (71) Applicant: International Business Machines Corporation, Armonk, NY (US)

(72) Inventors: Thomas A. Beavin, San Jose, CA (US); Naresh K. Chainani, Portland, OR (US); Sam S. Lightstone, Toronto (CA); Shaorong Liu, Evanston, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 448 days.

This patent is subject to a terminal disclaimer.

(21) Appl. No.: 14/965,737

(22) Filed: Dec. 10, 2015

(65) Prior Publication Data

US 2016/0196306 A1 Jul. 7, 2016

Related U.S. Application Data

(63) Continuation of application No. 14/591,596, filed on Jan. 7, 2015.

(51) Int. Cl.
*G06F 16/22* (2019.01)
*G06F 16/2453* (2019.01)
*G06F 16/2455* (2019.01)

(52) U.S. Cl.
CPC .... *G06F 16/24544* (2019.01); *G06F 16/2255* (2019.01); *G06F 16/2455* (2019.01); *G06F 16/2456* (2019.01); *G06F 16/24537* (2019.01)

(58) Field of Classification Search
CPC ......... G06F 17/30463; G06F 17/30469; G06F 17/3033; G06F 17/30466; G06F 17/30498;

(Continued)

(56) References Cited

U.S. PATENT DOCUMENTS 6,134,546 A * 10/2000 Bestgen ............ G06F 17/30498
6,219,660 B1 4/2001 Haderle
(Continued)

FOREIGN PATENT DOCUMENTS

CN 1825305 A 8/2006
CN 104050202 A 9/2014

OTHER PUBLICATIONS

Patrick et al. "Parllel Hash-Based Join Algorithms for Shared-Everything Environment" IEEE Transactions on Knowledge and Data Engineering vol. 6, No. 5 Oct. 1994.*

(Continued)

*Primary Examiner* — Tamara T Kyle
*Assistant Examiner* — Berhanu Mitiku
(74) *Attorney, Agent, or Firm* — Anthony V. S. England; Richard A. Wilhelm; Susan M. Maze (57) ABSTRACT

Performing a join of first and second database tables for a query includes applying a predicate of the query to the first table as a first predicate and determining how many distinct join key values the first table has that survive the applying of the first predicate, wherein a join key value of the first table that survives the applying of the first predicate is a surviving join key value for a second predicate. A selection includes selecting among applying the second predicate to the second table, probing the second table with the second predicate, and neither applying the second predicate to the second table nor probing the second table with the second predicate, wherein the selecting is responsive to the number of distinct, surviving join key values.

6 Claims, 3 Drawing Sheets

(58) Field of Classification Search
CPC ........... G06F 16/24544; G06F 16/2455; G06F 16/24537; G06F 16/2255
USPC .......................................... 707/706–707, 971
See application file for complete search history.

(56) References Cited

U.S. PATENT DOCUMENTS

| | | | |
|---|---|---|---|
| 6,615,206 B1 | 9/2003 | Jakobsson et al. | |
| 7,085,754 B2 | 8/2006 | Sinnott | |
| 7,698,253 B2 | 4/2010 | Hrle | |
| 7,814,094 B2 | 10/2010 | Au et al. | |
| 7,953,726 B2 | 5/2011 | Purcell | |
| 7,974,967 B2 | 7/2011 | Scheuermann | |
| 8,037,274 B2 | 10/2011 | Kawasaki | |
| 8,190,595 B2 | 5/2012 | Bruno | |
| 10,545,917 B2 * | 1/2020 | Dageville | G06F 16/172 |
| 2002/0010911 A1 | 1/2002 | Cheng | |
| 2005/0160102 A1 | 7/2005 | Abdo et al. | |
| 2006/0122975 A1 | 6/2006 | Taylor | |
| 2007/0073676 A1 * | 3/2007 | Carlson | G06F 16/24539 |
| 2008/0052266 A1 | 2/2008 | Goldstein | |
| 2012/0047158 A1 | 2/2012 | Lee | |
| 2012/0072455 A1 | 3/2012 | Jain | |
| 2013/0086038 A1 | 4/2013 | Perry | |
| 2013/0138630 A1 | 5/2013 | Yang | |
| 2013/0262435 A1 | 10/2013 | Bossman | |
| 2014/0214795 A1 * | 7/2014 | Attaluri | G06F 16/2456 707/714 |
| 2014/0250142 A1 * | 9/2014 | Pradhan | G06F 16/2453 707/765 |
| 2015/0039627 A1 * | 2/2015 | Sen | G06F 16/2255 707/747 |
| 2015/0088856 A1 * | 3/2015 | Hunter | G06F 16/24544 707/714 |
| 2015/0310063 A1 | 10/2015 | Beavin | |
| 2015/0310066 A1 | 10/2015 | Beavin | |
| 2016/0196302 A1 | 7/2016 | Beavin | |

OTHER PUBLICATIONS

Bent et al. "A Dynamic Distributed Federated Database" IBM, Emerging Technology Services City College of NY (CUNY) Conference Paper, Sep. 2008.*
Ronald Barber et al., Business Analytics in (a) Blink, Lecture Notes in Business Information Processing, v 126 LNBIP, p. 1-22, 2012, Enabling Real-Time Business Intelligence—5th International Workshop, BIRTE 2011, Springer Verlag.
List of IBM Patents or Patent Applications Treated as Related.
Thomas A. Beavin, et al. "Processing Queries Using Hybrid Access Paths," U.S. Appl. No. 14/259,831, filed Mar. 21, 2015.
Thomas A. Beavin, et al. "Processing Queries Using Hybrid Access Paths," U.S. Appl. No. 14/664,839, filed Mar. 21, 2015.
Thomas A. Beavin, et al. "Technology for Join Processing," U.S. Appl. No. 14/965,737, filed Jan. 7, 2015.
Breitling, "The Effects of OICA and OIC on Access Paths", Centrex Consulting Colporation, Hotsos Symposium Mar. 6-9, 2005, 31 pp.
IBM et al., "Adaptive Path Selection for Query With Input Variables", IPCOM000036179D, Jan. 28, 2005, 4 pp.
Chaudhuri et al., "Efficient Evaluation of Queries With Mining Predicates", IEEEICDE Proceedings of the 18th International Conference on Data Engineering, Feb. 26-Mar. 1, 2002, 12 pp.
Office Action dated Jul. 26, 2018 received from China Patent Office Jul. 31, 2018 in China counterpart application CN 105760419 A.

* cited by examiner

TECHNOLOGY FOR JOIN PROCESSING

BACKGROUND

A star schema includes a central fact table and one or more dimension tables, which are typically relatively smaller than the fact table. It is common for analytic queries in this context to join the central fact table with one or more of the dimension tables.

SUMMARY

A method for performing a join of first and second database tables for a query includes applying a predicate of the query to a first table as a first predicate and determining how many distinct join key values the first table has that survive the applying of the first predicate, wherein a join key value of the first table that survives the applying of the first predicate is a surviving join key value for a second predicate. A first selection includes selecting among applying the second predicate to the second table, probing the second table with the second predicate, and neither applying the second predicate to the second table nor probing the second table with the second predicate, wherein the selecting is responsive to the number of distinct, surviving join key values.

In another aspect, responsive to selecting in the first selection to either apply the second predicate to the second table or probe the second table with the second predicate, the method includes selecting, in a second selection, between probing and not probing a hash table for the first table responsive to whether the first table has a payload column.

In another aspect, the first selection is responsive to whether the number of distinct join key values is less in number than a predetermined amount.

In another aspect, the first selection is responsive to determining the first table is independent of the second table for at least some aspect of the query.

In another aspect, responsive to the number of distinct join key values not being less in number than the predetermined amount, the first selection selects to neither apply the second predicate to the second table nor probe the second table with the second predicate, and wherein responsive to the number of distinct join key values being less in number than the predetermined amount, the first selection selects to either apply the second predicate to the second table or probe the second table with the second predicate.

In another aspect, the method includes selecting, in the first selection, to probe the second table with the second predicate wherein selecting to probe the second table with the second predicate is responsive to detecting an index, zone map or synopsis table that maps access to the second table by the first table.

In another aspect, the first and second selections are performed during run-time execution of the query.

System and computer program products relating to the above-summarized methods are also described and claimed herein.

BRIEF DESCRIPTION OF THE DRAWINGS

The above described aspects of the present invention and others, including objects, forms, features and advantages, will become more apparent from the following detailed description of illustrative embodiments thereof, which is to be read in connection with the accompanying drawings. The drawings are not to scale and are, together with the detailed description, for clarity in facilitating the understanding of persons skilled in the related art. In the drawings.

DETAILED DESCRIPTION

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Figure 1:
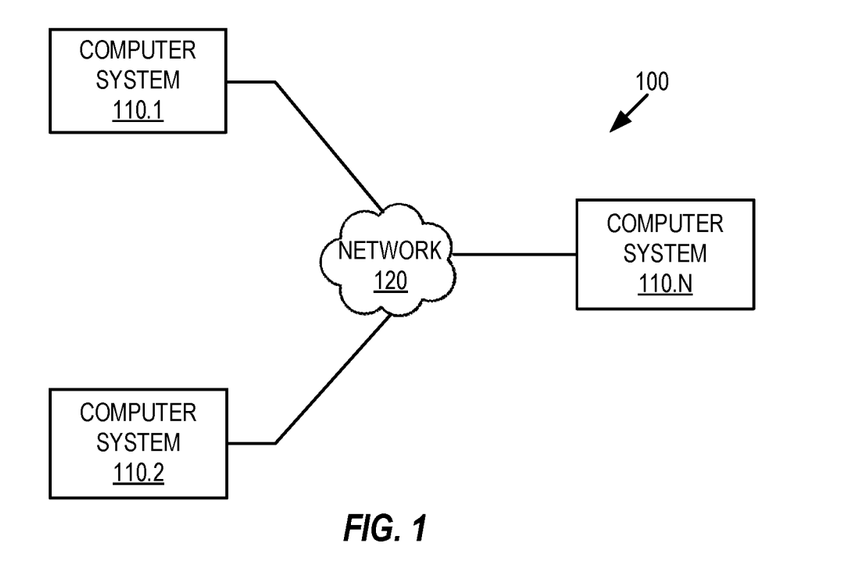
FIG. 1 illustrates a networked computer environment, according to embodiments of the present invention.

FIG. 1 illustrates an example computing environment 100, according to embodiments of the present invention. As shown, computing environment 100 includes computer systems 110.1, 110.2 through 110.N connects via network 120, which may be public or private. Systems 110.1, 110.2, etc. include respective modules respectively, which may be program or hardware modules configured to perform tasks for their respective devices.

Figure 2:
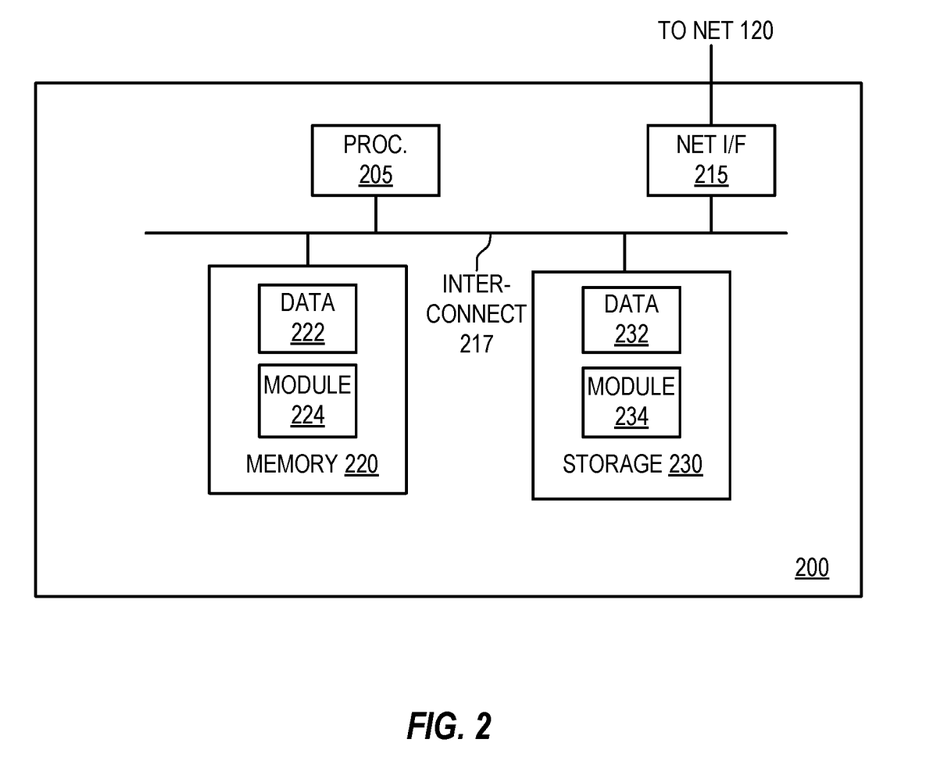
FIG. 2 is a block diagram of devices shown in FIG. 1, according to embodiments of the present invention.

FIG. 2 illustrates a system 200, which may be applied as any or all of computer systems 110.1, 110.2, etc., according to embodiments of the present invention. As shown, system 200 includes a central processing unit (CPU) 205, a network interface 215, an interconnect (i.e., bus) 217, a memory 220, and storage 230. CPU 205 may retrieve and execute programming instructions stored in memory 220. Similarly, CPU 205 may retrieve and store application data residing in memory 220. Interconnect 217 may facilitate transmission, such as of programming instructions and application data, among CPU 205, storage 230, network interface 215, and memory 220. CPU 205 is included to be representative of a single CPU, multiple CPUs, a single CPU having multiple processing cores, and the like. Additionally, memory 220 is included to be representative of a random access memory, which includes data and program modules for run-time execution, such as example data 222 and module 224 shown, according to embodiments of the present invention. However, it should be understood that one or more of modules such as module 224 may be implemented by other hardware and may be firmware.

Data 222 and module 224 may be instances of data and program modules from storage 230, such as example data 232 and module 234 shown, for run-time execution by CPU 205 in memory 220. Data and program modules in storage 230 may include database tables and one or more query execution modules. Storage 230 may be a disk drive storage device, for example. Although shown as a single unit, storage 230 may be a combination of fixed and/or removable storage devices, such as fixed disc drives, floppy disc drives, tape drives, removable memory cards or optical storage, network attached storage (NAS), or a storage area-network (SAN).

Figure 3:
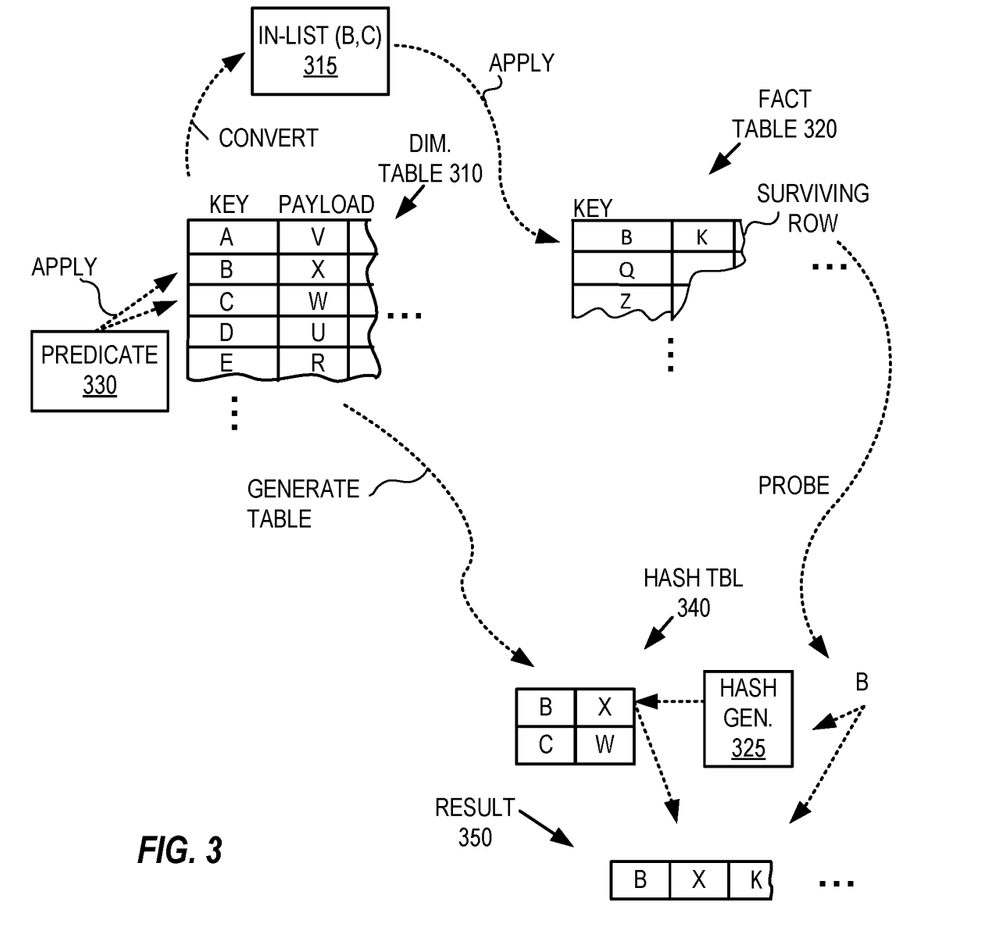
FIG. 3 illustrates certain aspect of join processing, according to embodiments of the present invention.

FIG. 3 illustrates data structures and aspects of query execution, according to embodiments of the present invention, wherein a dimension table 310 and fact table 320 are shown. Although such dimension tables 310 are typically smaller than the fact table 320, joining them with fact table 320 is still resource intensive and is, accordingly, relatively slow. There are various ways to reduce resources consumed and increase speed of query execution. A hash join process is one way. For a hash join process, a hash table such as 340 is built for at least some rows of its respective dimension table 310 involved in the join process. A hash table 340 is created after scanning its dimension table 310. This is typically quick and efficient, but still requires probing the one or more hash tables based on rows in the fact table 320. Even for small hash tables, this probing is still resource intensive and slow when a large fact table is involved, which may even include a billion or more rows. Accordingly, additional join processes and structures are disclosed herein.

One or more optimization techniques are sometimes used to improve probing or scanning. For example, some systems determine a range of values for a key column of an inner table, such as a dimension table 310, for example, and then apply the range as a predicate for a key column of an outer table, e.g., fact table 320. Alternatively, both a Bloom filter and the range predicate may be applied.

Regardless of such optimizing, however, a range can still cover a large portion of a fact table such as table 320. For example, consider a query for sales on consecutive Black Fridays, where a date dimension table is joined with a sales fact table that has thirteen months of sales transactions. Predicates on the date dimension table will reduce it to only two rows, one for each Black Friday. Nevertheless, since the two Black Fridays are twelve months apart and the sales fact table has thirteen months of sales transactions, most of the dates in the sales fact table fall within the twelve month range of Black Friday dates. Consequently, computing a min/max range for the query and applying the range to the sales fact table does not significantly reduce rows of the sales fact table that will require probing of the hash table of the date dimension table.

In another optimization example, consider the following context, wherein a table called "product" is designated as a dimension table and has 100 rows that each represent a product and has columns for productID, productName and productLaunchDate. A table called "sales" is designated as a fact table and has 5 million rows, each representing a sales transaction, where the columns are transactionID, transactionAmount, transactionDate and productID. A business analyst wanting to understand the sales for the iMac product in year 2013 may issue the following query (referred to herein as "Query 1"):

select sum(transactionAmount) from sales, product where sales.productID=product.productID and product.productName='iMac' and sales.transactionDate between '1/1/2013' and '12/31/2013'

For this query, a query execution module, such as an instance of module 224 in FIG. 2, for example, may select actions and sequence at run-time according to a hash join execution plan, in which the query execution module applies the specified predicate on productName and then builds a hash table with product.productID as the key. Rows that are included in the hash table are those "surviving rows" of the product table having "iMac" in the product name column, i.e., those rows that satisfy the product.productName='iMac' predicate.

According to embodiments of the present invention, for performing a join process the query execution module dynamically selects one or more actions at run-time according to predetermined criteria, which may include selecting a sequence of actions. For example, the query execution module may apply one or more relevant predicates of the query to one or more relatively small dimension tables 310 at run-time. FIG. 3 shows applying a predicate to dimension table 310 at run-time, wherein the query execution module scans dimension table 310 to apply the predicate 330 and may also generate hash table 340. Then, using the results of applying the one or more predicates, the query execution module may also at run-time convert the results into one or more respective IN-list predicates for run-time probing of, or application to, larger, fact table 320.

To illustrate the meaning of "IN-list predicate," consider tables having a "firstName" column that contains first names. For selecting rows in table 320 that include first names John, Jack and Rick, for example, an IN-list predicate could be stated as follows, according to an example syntax:

firstName IN {'John', 'Jack', 'Rick'}.

FIG. 3 shows two rows of table 310 that survive application of the predicate, for example, and shows a query execution module responsively generating a hash table 340 for the payload column of the two surviving rows of dimension table 310. FIG. 3 also shows the query execution module converting those two rows into an IN-list predicate 315 at run-time. FIG. 3 also shows the query execution module applying the IN-list predicate 315 at run-time to fact table 320, yielding one surviving row. FIG. 3 shows probing hash table 340, using the join key value of the surviving row of fact table 320, to find a matching value from the payload column of dimension table 310.

In the right circumstances, applying predicates to dimension tables 310 at run-time and then converting those results into IN-list predicates for application at run-time to a fact table 320 can greatly improve join processing time. Consider, for example, a particularly beneficial case where the query execution module applies at run-time one or more predicates of the query that are relevant to a particular dimension table 310, and where the query execution module consequently determines that there is no join payload for the result from dimension table 310 after applying the predicate(s). "Payload" refers to columns of the product table that are needed in addition to the join key.

A no-payload example is illustrated by the above described application of Query 1 to the product and sales tables, where the product table exemplifies a dimension table 310. The join key itself, the product ID for the iMac product name, is the only column that the query execution module generates for the hash table from the surviving rows of the product table after applying the predicate. A no-payload case, where no columns of a dimension table 310 are needed other than the join key, is beneficial in embodiments of the present invention, because by converting the join key column results into IN-list predicates for application at run-time to a fact table 320, the lack of other columns of dimension table 310 involved in the join operation allows the query execution module to completely avoid probing the hash table for the dimension table 310.

To illustrate an example for the same tables in which there is a payload column included in the hash table that the query execution module generates from the surviving rows of the product table after applying a predicate, consider a business analyst wanting a report that returns the total sales in last 3 years for each product, by name. The analyst may issue the following query:

select productName, sum (transactionAmount) from sales, product where sales.productID=product.productID and transactionDate>'1/1/2010' group by productName In this case, after applying the predicate sales.productID=product.productID, the query execution module includes, for the hash table from surviving rows of the product table, both product.productID as the join key and productName as a payload column of the hash table, since the product name is needed for a subsequent grouping operation and for returning in the report to the business analyst.

A Bloom filter may also be created by query execution module to reduce the number of non-matching probes into hash tables. A bloom filter is an approximate filter that may have false positive rows that survive probing, but which are then eliminated during hash table look up. That is, responsive to scanning of a dimension table, a query execution module may generate a bloom filter and a hash table for rows of the dimension table that survive predicate application. Prior to probing the hash table, the query execution module probes bloom filter to determine whether each row of the probing can be discarded.

It should be understood that in cases where a dimension table 310 or its predicate result are sufficiently small such that the query execution module creates and applies the above described IN-list predicate, it would be redundant for fact table 320 to probe an approximate Bloom filter after an exact IN-list predicate has already been applied based on a given dimension table 310.

Figure 4:
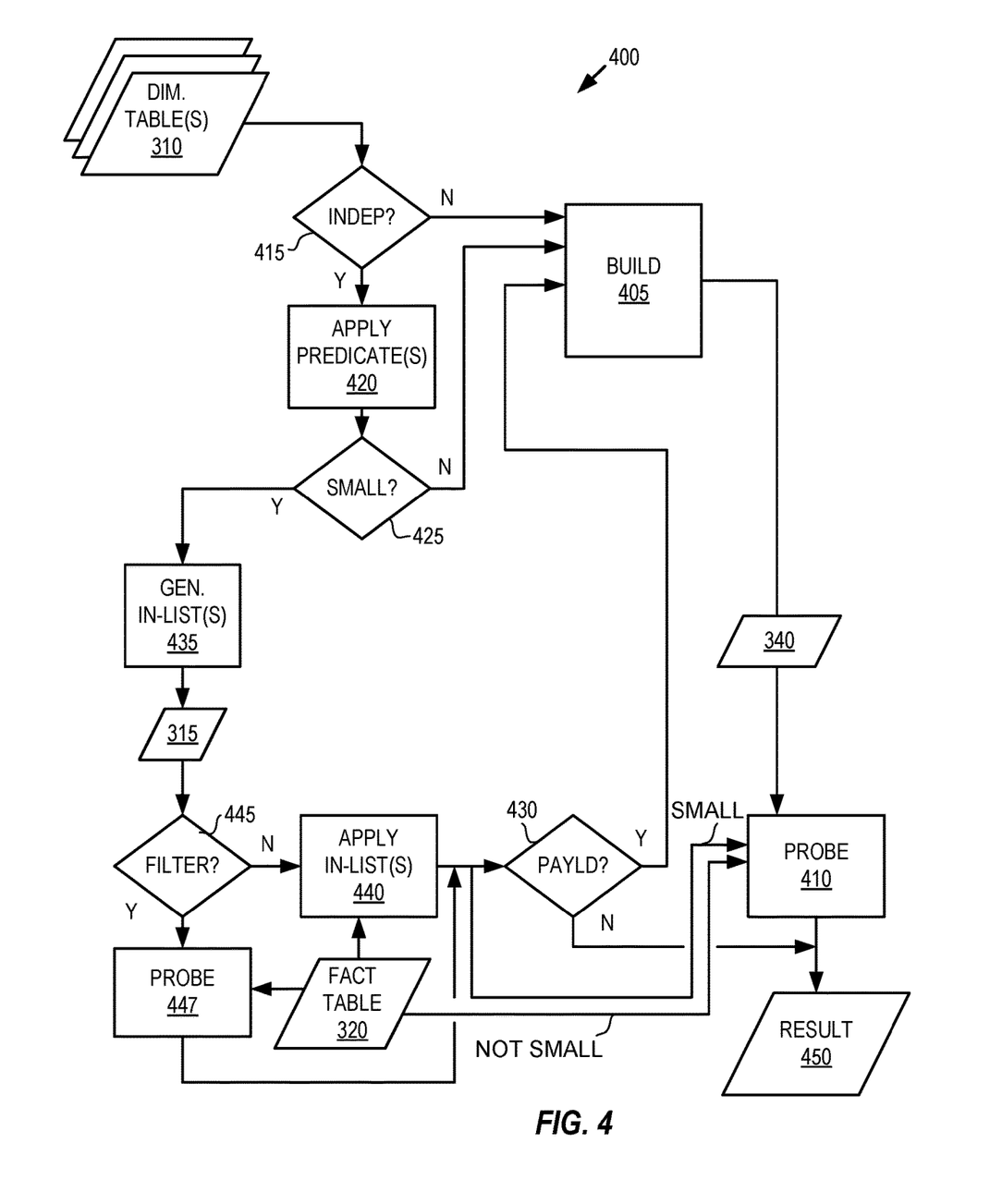
FIG. 4 illustrates additional aspects of join processing, according to embodiments of the present invention.

Referring to FIGS. 3 and 4, a join process 400 executed by a query execution module includes a build stage 405 and a probe stage 410. Regarding build stage 405, rather than merely applying local predicates, computing minimum and maximum join key values on a dimension table and then building a bloom filter and a hash table, the query execution module selectively performs one or more additional actions 415-445, according to embodiments of the present invention.

The query execution module selects one or more dimension tables 310 on which to perform one or more operations before joining with fact table 320 responsive to detecting 415 that such a dimension table 310 has no dependency on fact table 320 for the given query, e.g., no LEFT JOIN, sideways reference, or other attribute that would require the dimension table to be accessed after the fact table. (Such a dimension table may be referred to herein as an "independent dimension table.") Upon detecting 415 an independent dimension table 310, the query execution module applies 420 one or more local predicates to the independent dimension table 310 at run time before processing of fact table 320 at actions 440 or 447, etc.

For surviving rows (e.g., the rows with keys B and C in FIG. 3) of each dimension table 310 to which the query execution module applied 420 a local predicate 330, the query execution module performs actions 425, which include comparing join key values with one another for a given join key column_in order to determine distinct join key values and count how many exist. (The values have to be compared with one another to find redundant values, so that when counting distinct join key values each redundant value is eliminated from counting and thereby not counted more than once.) If the comparing reveals that surviving rows of a particular dimension table have fewer than a predetermined number of distinct join key values, such as, for example, 10 distinct join key values, the query execution module designates 425 the particular dimension table 310 as a small dimension table, in which case the query execution module also performs additional actions prior to probing 410 hash table 340 of dimension table 310, wherein the additional actions include creating 435 an IN-list predicate 315 for those distinct join key values of small dimension table 310. Further, for this condition the query execution module does not build a Bloom filter for small dimension table 310 in build stage 405.

If the query execution module determines 430 that the small dimension table 310 has no payload for the query (unlike in FIG. 3), the query execution module also skips the build stage process 405 and does not build a hash table 340 for dimension table 310. Thus, upon a "No" decision at payload decision block 430, process 400 branches directly to result 450 without doing hash table 340 probing action 410 and does not build hash table 340 for dimension table 310 when table 310 has no payload. That is, in this special situation, where dimension table 310 does NOT have a payload AND where independence is satisfied at 415, so that a query predicate can be applied 420 to dimension table 310 before additional operations for joining dimension table 310 and fact table 320, AND where the surviving values of applying the predicate at 420 are determined at 425 to be small in number, result 450 is produced merely by applying 440 the In-List 315 to fact table 320 or by probing 447 fact table 320 based on IN-list 315.

If query execution module process 400 determines at 430 that the small dimension table 310 does have a payload for the query, then the query execution module does build a hash table 340 for the small dimension table in build stage 405, and the query execution module does probe 410 hash table 340 of the small dimension table 310, since the probing 410 is necessary to retrieve one or more payload columns of dimension table 310. (See example in FIG. 3, wherein payload column value "X" for the surviving row is obtained (result 350) from probing 410 hash table 340 via hash generation 325 of an address using value "B" from the join key column.) However, each such probe 410 is guaranteed to find a match because of first applying 440 to fact table 320 the above described IN-list predicate 315 of the distinct join key values from small dimension table 310, as described herein. This is advantageous not only because it avoids probes that are not hits, but also because it reduces overhead that would otherwise be required to keep track of which rows match when probing a hash table. Likewise, it allows avoiding use of a Bloom filter, as previously mentioned.

In a further aspect of selecting actions to join fact table 320 and dimension tables 310 during run time, the query execution module process 400 further classifies 445 as filtering or non-filtering each dimension table 310 that was determined 415 at run time to be independent and determined 425 at run time to be small. The query execution module classifies 445 a dimension table 310 as a filtering type responsive to detecting fact table 320 has one or more indexes or zone maps/synopsis tables that map to the dimension table 310 and that can be used to probe 447 fact table 320 for a given query. Pursuant to filtering 445, FIG. 4 shows that one branch of process 400 includes directing the probing 447 of fact table 320 by an index or the like of a dimension table 310 that is classified 445 as filtering and also shows another branch at action 440, i.e., the branch for when filter decision 445 has determined there is no index or the like for probing 447. In this branch, query execution module applies 440 IN-list 315 as predicates to fact table 320. Whether by the action of probing 447 based on IN-list 315 or applying 440 the IN-list 315 as one or more predicates, such action may reduce fact table 320 to fewer rows, where each remaining row respectively satisfies an item of IN-list predicate 315.

A difference between applying a predicate to a table and probing the table is relevant to dynamic join sequence adjustment according to embodiments of the present invention. Applying a predicate to a table does not reduce the number of rows accessed within the table, but may reduce the number of rows that are qualified to be joined to another table and, thus, the number of rows in the result set. Using a predicate to probe a table reduces the number of rows accessed within the table. For example, take the IN-list predicate, FACT.C1 IN (1,2,3). When this is applied to the FACT table as in IN-list predicate it is applied to every row of the FACT table. However, if this predicate is used to probe the FACT table (either using an index on the FACT table or zone maps, etc.) then only those rows in the FACT table where C1 is equal to one of the three values will be accessed.

According to embodiments of the present invention, dynamic join sequence adjustment recognizes when an IN-list predicate can significantly and efficiently reduce the number of rows in a FACT table that need to be accessed and in such cases use the IN-list predicate to probe the FACT table. In cases where the IN-list predicate doesn't significantly reduce the number of rows accessed in the FACT table, the IN-list predicate is applied against FACT table rather than used to probe the FACT table.

It should be appreciated from the actions shown in FIG. 4 that regardless of whether each dimension table 310 is deemed 445 to be the filtering type, the query execution module converts the distinct join key values of small, independent dimension tables into respective IN-list predicates 315 for run time application 440 to, or probing 447 of, fact table 320. Also regardless of whether they are deemed to be the filtering type, the query execution module generates a hash table 340 (and may also generate a bloom filter or sparse index in build process stage 405) for dimension table 310 unless it is deemed 415 independent and deemed 425 small and determined 430 not to have a payload required for the query. Thus, a hash table 340 is built 405 for each non-small, independent dimension table 310, each non-independent dimension table 310, and for each small, independent dimension table 310 that has a payload, regardless of whether they are deemed 445 to be the filtering type. Each such hash table 340 (and a bloom filter or sparse index) is for probing 410 with respect to fact table 320, i.e., in response to scanning of fact table 320 to find matches in hash table 340 according to the query.

If a hash table 340 is built 405 for dimension table 310, i.e., built 405 because table 310 includes a payload or is not independent or not small, query execution module performs probing actions at 410, wherein it scans the rows of fact table 320 remaining from probing 447 or applying 440 and probes 410 hash table 340 responsive to those remaining rows of fact table 320, thereby getting matching payload of dimension table 310.

In a query simulation illustrating aspects disclosed herein, a dimension table had no payload and had two rows after applying 420 predicates and a fact table had 7.2 billion rows after applying 440 a predicate for the join key of the two rows. Query processing time was 13.6 seconds when using a build process 405 without the addition of processes 415-445. When using the additional processes 415-445 and accordingly reducing aspects of build stage processing 405, query processing was reduced to 0.39 seconds.

Embodiments of the present invention described herein above result in selection of the efficient join sequence for star schema queries and do not rely on statistics, which may be missing or inaccurate, nor on estimated predicate selectivity, which estimates may be inaccurate for complex predicates or predicates involving parameter markers. This is done with low overhead, which is at least partly due to using information obtained during a stage of join processing that occurs prior to fact table processing, which is a stage that must be performed in any case. Embodiments of the present invention provide particularly effective processing when dimension tables, after any filtering (i.e., applying predicates thereto), are relatively small. Hash joins are used herein as examples, but embodiments of the present invention also apply to other joins, such as sort-merge joins, for example.

As will be understood by a person of ordinary skill in the art, the above are examples of inner joins in implicit join notation. For such inner join embodiments of the present invention, execution of the join operation creates a new result table such that each row of the result table includes one or more values from a row of the left or right table, or both tables, only if that row has a row of the left table that satisfies a join key value of the IN-List predicate generated from the right table.

Embodiments of the present invention also include left outer join embodiments, wherein execution of the join operation creates a new result table that includes all rows of the left table. For such embodiments of the present invention, the query execution module avoids probing the hash table for the right table and simply sets the payload columns of the right table to "NULL" in the result table for rows that do not satisfy the generated IN-list predicate. (Herein, for a hash join, left side=outer side=probe side and right side=inner side=build side. This applies to both inner joins and outer joins.) Embodiments of the present invention also include anti-join embodiments, wherein execution of the join operation creates a new result table such that each row of the result table includes one or more values from a row of the left or right table, or both tables, only if that row does NOT have a row of the left table that satisfies a join key value of a NOT IN-List predicate generated from the right table.

Decisions about actions for a join operation can be done at the time of compiling a query (at "compile-time") into executable code, where the decisions may be based on database statistics, for example. Alternatively, decisions about join operation actions can be done when executing the compiled query (at "run-time") based on the number of distinct values of the join inner as described herein above. Compile-time decision making can suffer due to out of date statistics or poor correlation among various predicates. In embodiments of the present invention wherein an override mode is provided for performing process 400 by a query execution module, at least two things can be done, as follows. First, if a decision was made at compile-time not to do the run-time join optimization actions described herein, but the actual number of distinct values on the join inner is determined at run-time to be less than a predetermined amount, then the query execution module may at run-time override the compile-time decision and perform the run-time IN-List optimization actions described herein. Second, if a decision was made at compile-time to do the run-time join optimization actions described herein, but the actual number of distinct values on the join inner is determined at run-time to be more than some predetermined amount, then the query execution module may at run-time override the compile-time decision and not perform the run-time IN-List optimization actions described herein.

The above-described examples and depictions in the Figures are not meant to imply architectural limitations. For example, any of devices 110.1, 110.2, etc. may be a notebook computer, hand held computer, smart phone, kiosk, etc.

Further, the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for performing a join of database tables for a query, wherein the database tables include dimension tables and a fact table, comprising:

selecting at least a first one of the dimension tables to join with the fact table in response to determining that the query references the first dimension table and that the first dimension table is independent of the fact table for at least some aspect of the query;

applying a local predicate of the query to the first dimension table as a first predicate prior to performing a build operation, wherein any row of the first dimension table that survives the applying of the first predicate is a surviving row;

determining, responsive to the applying the predicate of the query to the first dimension table as a first predicate, how many distinct join key values are included in the surviving rows of the first dimension table, wherein the join key values included in the surviving rows of the first dimension table, are surviving join key values;

determining, during run-time execution, to perform a hash join of the first dimension table and the and the fact table in response to determining there is at least one distinct, surviving join key value and the first dimension table includes a payload column; and performing, in response to determining that the number of distinct, surviving join key values does not exceed a predetermined number, the hash join using a hash table that is reduced to less rows than all rows of the dimension table by having only hash table rows for the surviving rows of the first dimension table, wherein performing the hash join using the reduced hash table includes:

performing the build operation to build the reduced hash table for the first dimension table, where the build operation generates the reduced hash table having only hash table rows for the surviving rows of the first dimension table;

generating an IN list for the surviving join key values of the first dimension table;

selecting surviving rows of the fact table with respect to the IN list;

probing the reduced hash table, wherein the probing of the reduced hash table is with the surviving rows of the fact table; and returning a result from the probing of the reduced hash table.

2. The method of claim 1, wherein the method comprises:
determining to perform the join of the first dimension table and the fact table without building a hash table for the first dimension table when the first dimension table has no payload column and the number of distinct, surviving key join values of the first dimension table does not exceed the predetermined number.

3. The method of claim 1, wherein the selecting surviving rows of the second table with respect to the IN list comprises:
probing the fact table with the IN list responsive to detecting an index, zone map or synopsis table that maps access to the fact table by the first dimension table.

4. The method of claim 1, wherein the selecting surviving rows of the fact table with respect to the IN list comprises:
applying the IN list to the fact table responsive to not detecting an index, zone map or synopsis table that maps access to the fact table by the first dimension table.

5. The method of claim 1, further comprising:
performing the hash join when the number of distinct, surviving join key values exceeds the predetermined number, including:
building a hash table for the full first dimension table;
probing the full hash table with all the rows of the second table; and
returning a result from the probing of the full hash table.

6. The method of claim 1, wherein the probing the reduced hash table with the surviving rows of the fact table is guaranteed to find a match because of the selecting surviving rows of the fact table with respect to the IN list for the distinct join key values from the rows of the first dimension table that survive the applying of the local predicate.

* * * * *